US008819201B2

(12) United States Patent
Netrakanti et al.

(10) Patent No.: US 8,819,201 B2
(45) Date of Patent: Aug. 26, 2014

(54) METHOD AND APPARATUS FOR PROVIDING ROUTING AND ACCESS CONTROL FILTERS

(75) Inventors: Mallikarjun Netrakanti, Morganville, NJ (US); Sumita Dutta, Marina Del Rey, CA (US); Gary Flack, Smithton, IL (US); William Lamont, Tinton Falls, NJ (US); Rodney Stoltzfus, Lincroft, NJ (US); Paul Suntrup, Pacific, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 829 days.

(21) Appl. No.: 12/187,556

(22) Filed: Aug. 7, 2008

(65) Prior Publication Data
US 2010/0037287 A1 Feb. 11, 2010

(51) Int. Cl.
*G06F 15/177* (2006.01)
*G06F 15/173* (2006.01)
*H04L 12/24* (2006.01)

(52) U.S. Cl.
CPC .......... *H04L 41/0226* (2013.01); *H04L 41/022* (2013.01)
USPC ............ 709/222; 709/220; 709/221; 709/242

(58) Field of Classification Search
USPC .................. 709/206, 224, 220–222; 726/1, 3; 713/201
See application file for complete search history.

(56) References Cited

U.S. PATENT DOCUMENTS

| | | | |
|---|---|---|---|
| 6,678,827 B1 * | 1/2004 | Rothermel et al. ............... | 726/6 |
| 6,738,908 B1 * | 5/2004 | Bonn et al. ........................ | 726/4 |
| 6,766,364 B2 * | 7/2004 | Moyer et al. ................... | 709/221 |
| 6,978,301 B2 * | 12/2005 | Tindal ............................ | 709/223 |
| 7,155,496 B2 * | 12/2006 | Froyd et al. .................... | 709/220 |
| 7,246,162 B2 * | 7/2007 | Tindal ............................ | 709/223 |
| 7,246,163 B2 * | 7/2007 | Tindal ............................ | 709/223 |
| 7,317,952 B2 * | 1/2008 | Bhandiwad et al. ............ | 700/17 |
| 7,650,396 B2 * | 1/2010 | Tindal ............................ | 709/220 |
| 7,668,944 B2 * | 2/2010 | Leib et al. ...................... | 709/222 |
| 2003/0091042 A1 * | 5/2003 | Lor ................................. | 370/389 |
| 2003/0149766 A1 * | 8/2003 | Syvanne et al. ................ | 709/224 |
| 2003/0172151 A1 * | 9/2003 | Schade .......................... | 709/224 |
| 2004/0030923 A1 * | 2/2004 | Tindal et al. .................... | 713/201 |
| 2004/0117452 A1 * | 6/2004 | Lee et al. ........................ | 709/208 |
| 2004/0128545 A1 * | 7/2004 | Chakravarty .................. | 713/201 |
| 2004/0158631 A1 * | 8/2004 | Chang et al. ................... | 709/224 |
| 2004/0181690 A1 * | 9/2004 | Rothermel et al. ............ | 713/201 |
| 2004/0268150 A1 * | 12/2004 | Aaron ............................ | 713/201 |
| 2005/0010819 A1 * | 1/2005 | Williams et al. ............... | 713/201 |
| 2005/0015622 A1 * | 1/2005 | Williams et al. ............... | 713/201 |
| 2005/0257267 A1 * | 11/2005 | Williams et al. ................ | 726/25 |
| 2008/0301765 A1 * | 12/2008 | Nicol et al. ........................ | 726/1 |

* cited by examiner

*Primary Examiner* — Tae Kim

(57) ABSTRACT

A method and apparatus for providing an access control filter and/or a route filter in a network are disclosed. For example, the method receives a new filter rule or a modified filter rule associated with at least one of: a routing policy, or a security policy. The method creates or modifies one or more filter templates in accordance with the new filter rule or the modified filter rule. The method identifies one or more affected interfaces and audits the one or more affected interfaces. The method then generates one or more commands in accordance with the one or more filter templates if the auditing of the one or more affected interfaces is successful, and downloads filter content to one or more routers using the one or more commands.

11 Claims, 4 Drawing Sheets

METHOD AND APPARATUS FOR PROVIDING ROUTING AND ACCESS CONTROL FILTERS

The present invention relates generally to communication networks and, more particularly, to a method and apparatus for providing routing and access control filters in networks, e.g., Internet Protocol (IP) networks, Voice over Internet Protocol (VoIP) networks, Virtual Private Networks (VPN), and the like.

BACKGROUND OF THE INVENTION

A network service provider may implement routing and access control filters on its provider edge routers where customer edge routers interface into the service provider's network. The filters associated with the customer edge router on the provider edge router may be manually configured for security and routing policies using the router's Command Line Interface (CLI). Using vendor or router specific steps for manually configuring the filters is costly, error prone and time consuming. Furthermore, the values of the configurable parameters change over time based on the router vendor, type of service, and changes in network routing, customer routing, and/or security policy.

SUMMARY OF THE INVENTION

In one embodiment, the present invention discloses a method and apparatus for providing an access control filter and/or a route filter in a network. For example, the method receives a new filter rule or a modified filter rule associated with at least one of: a routing policy, or a security policy. The method creates or modifies one or more filter templates in accordance with the new filter rule or the modified filter rule. The method identifies one or more affected interfaces and audits the one or more affected interfaces. The method then generates one or more commands in accordance with the one or more filter templates if the auditing of the one or more affected interfaces is successful, and downloads filter content to one or more routers using the one or more commands.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing access control and/or routing filters in networks. Although the present invention is discussed below in the context of Internet Protocol (IP) networks, the present invention is not so limited. Namely, the present invention can be applied for other types of packet networks.

Figure 1:
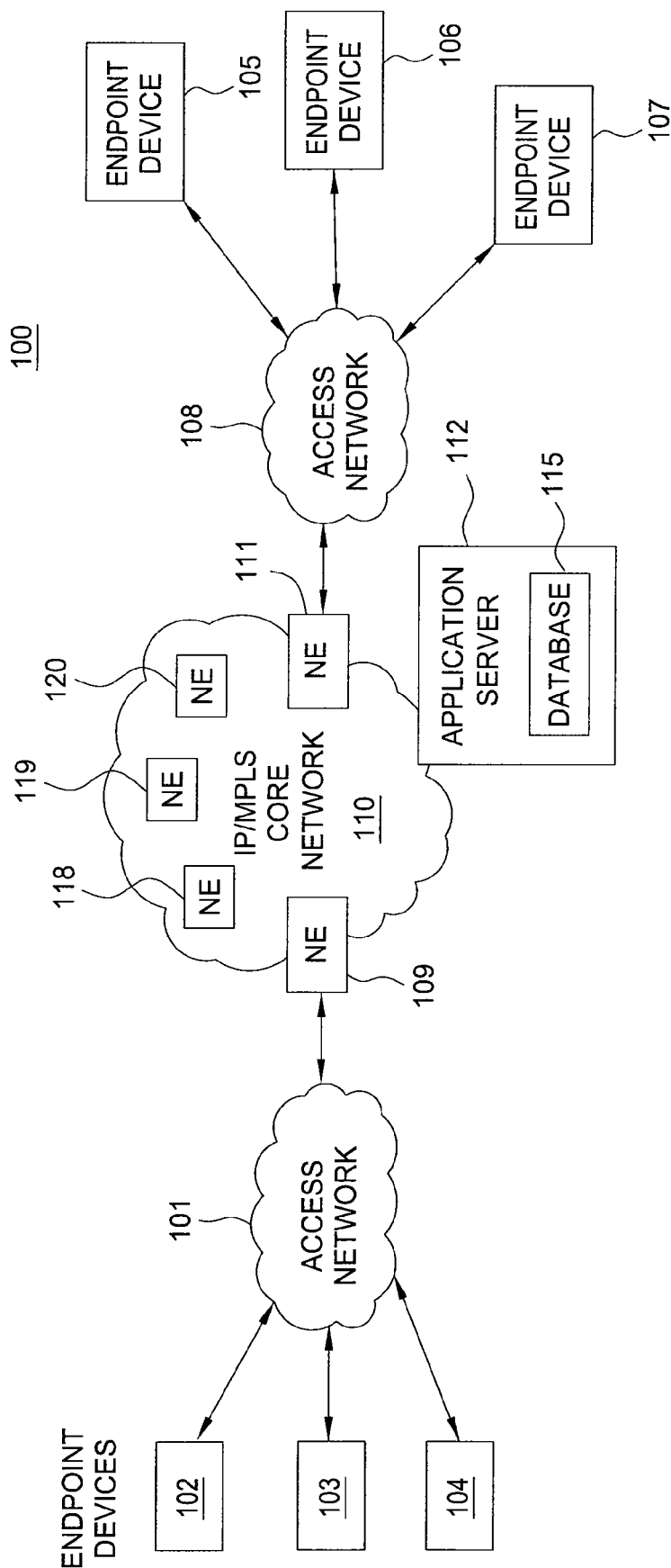
FIG. 1 illustrates an exemplary network related to the present invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 to exchange data packets.

In one embodiment, the packet network may comprise a plurality of endpoint devices or networks 102-104 configured for communication with the core packet network 110 (e.g., an IP based core backbone network supported by a service provider) via an access network 101. Similarly, a plurality of endpoint devices or networks 105-107 are configured for communication with the core packet network 110 via an access network 108. The network elements (NEs) 109 and 111 may serve as gateway servers or edge routers for the network 110.

The endpoint devices 102-107 may comprise endpoint devices such as personal computers, laptop computers, Personal Digital Assistants (PDAs), servers, routers, networks and the like. The access networks 101 and 108 serve as a means to establish a connection between the endpoint devices 102-107 and the NEs 109 and 111 of the IP/MPLS core network 110. The access networks 101 and 108 may each be comprised of private line, Ethernet, Frame-Relay, ATM, Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements and so on are depicted in FIG. 1, the communication system 100 may be expanded by including additional endpoint devices, access networks, network elements, and/or application servers, without altering the present invention.

The above IP network is described to provide an illustrative environment in which packets for voice and data services are transmitted and routed on networks. A network service provider may implement access control and route filters on its provider edge routers where customer edge routers interface into the service provider's network. For example, the service provider may manually configure the access control filter using the router's Command Line Interface (CLI). However, manual configuring of filters is costly, time consuming, error-prone, and non-scalable to large networks.

In one embodiment, the current invention provides a method for implementing filters throughout a network using a filter template tool. To better understand the current invention, the following terminology will first be provided:

Access control filter;
Route filter
Network security policy; and
Network routing policy.

Access control filter refers to a filter that is used to ensure that information is made available based upon a filter parameter, e.g., from a permitted list of IP addresses. For example, the filtering of packets may be based on source IP addresses, destination IP addresses, masks and/or routing protocols. The access control filters are configured on Internet accessible router interfaces, e.g., interfaces on PE routers in communication with CE routers. For example, an access control filter may be configured on a PE interface connected to a particular CE. The content of an access control filter may be established based on network security policies established for an IP network and the IP endpoints for each PE interface as described below.

Route filter is a filter used to restrict the routing data passed from the customer edge to the network based on the routing policy and the route-able IP endpoints for each PE interface as described below.

Network security policy provides entries within interface filters: to restrict packets that may be allowed into an IP network, or to block packets based on packet type, source and/or destination addresses, mask and/or routing protocols.

Network routing policy provides entries for routing data associated with specific endpoints, which may include generic entries based on the service.

The current invention first provides a filter template tool that provides one or more filter templates that may be used to configure one or more filters for Internet accessible router interfaces throughout a network. For example, an IP network may have 30 PE routers with 1000 interfaces connected to CEs. The filter templates created by a filter template tool may be used to configure filters for each of the 1000 interfaces.

Figure 2:
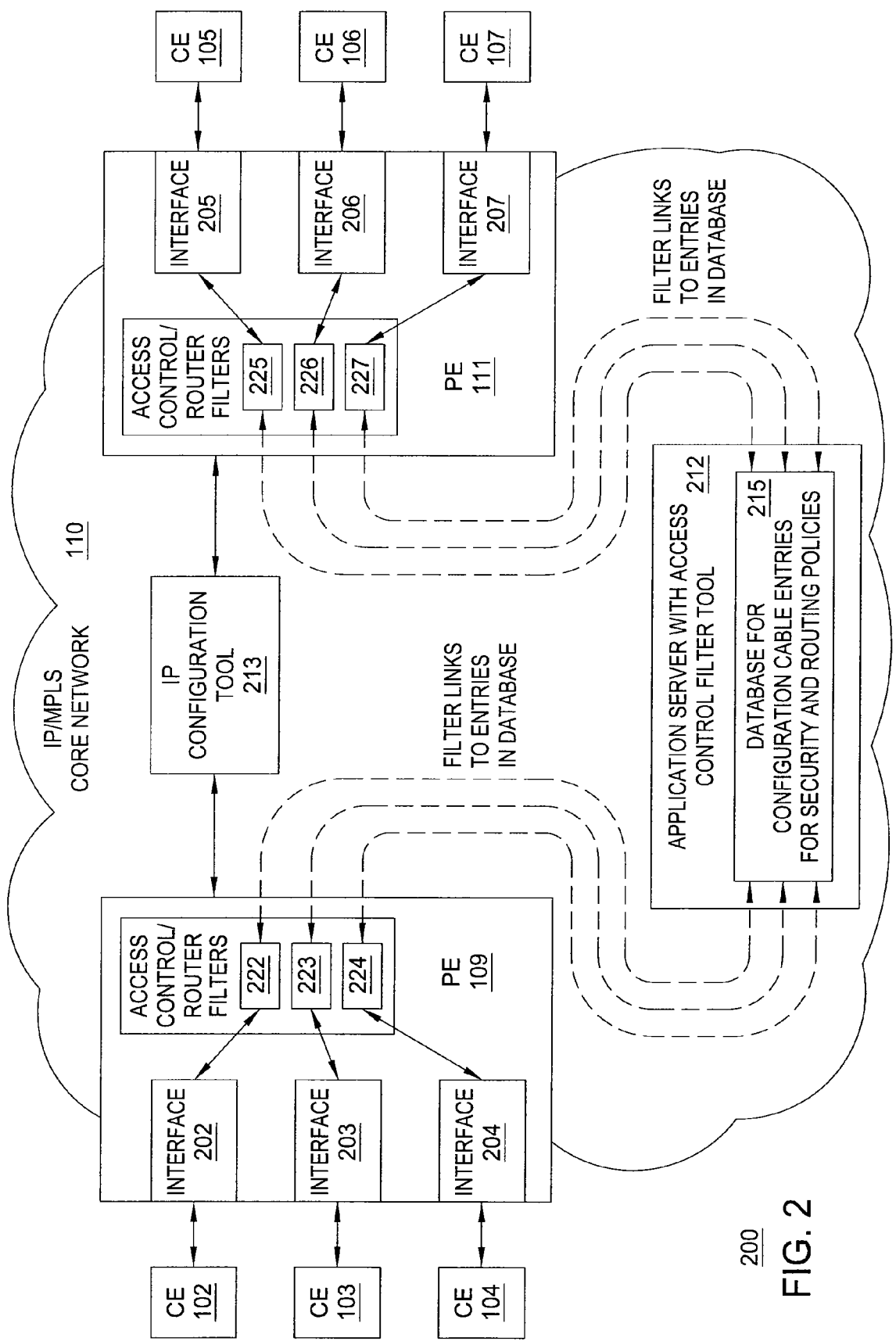
FIG. 2 illustrates an exemplary network with the current invention for providing access control and/or routing filters.

FIG. 2 illustrates an exemplary network 200 of the current invention for providing an access control filter. Customer Edge (CE) routers 102-104 are accessing services from IP/MPLS core network 110 through PE router 109. Similarly, customer edge routers 105-107 are accessing services from IP/MPLS core network 110 through PE router 111. The IP/MPLS core network 110 also includes an application server 212 and IP configuration tool 213. The PE router 109 interfaces with CE routers 102, 103 and 104 via interfaces 202, 203 and 204, respectively. The PE router 111 interfaces with CE routers 105, 106 and 107 via interfaces 205, 206 and 207, respectively. The PE router interfaces 202, 203, 204, 205, 206 and 207 use various access control and routing filters 222, 223, 224, 225, 226 and 227, respectively. The number of PE router interfaces and filters as shown in FIG. 2 is only illustrative. It should be noted that any number of PE router interfaces and filters can be deployed in accordance with the requirements of a particular implementation.

In one embodiment, the service provider implements a filter tool in application server 212. The application server 212 also contains a database 215. The application server 212 stores a set of configurable entries for security and routing policies in the database 215. Each of the configurable entries for security and routing policies has: a format type that defines where the entry appears in a filter, and a specific format rule. A format rule is established to link entries to: specific routing fields for an interface on a router, or to generic entries that may depend on the network or service associated with that interface.

In one embodiment, the configurable entries for security and routing policies are provided in a format supported by the router. For example, different router vendors may use different formats for configuring router interfaces for affecting filters.

The filter template tool first links each of the filters for Internet accessible router interfaces to a set of configurable entries for security and routing policies. For example, the tool links each of the filters 222-227 to a set of configurable entries in the database 215. That is, if a configurable entry in the database 215 has a modification, the filters that are linked to it may also have to be modified.

In one embodiment, entries into filters for security and routing policies are managed by using logical templates for the filters. For example, a group of ports or interfaces from the same vendor may be able to use the same logical template along with their own configuration, e.g., routing data.

If the service provider or a customer invokes a change in a filter rule, the filter template tool may be provided with an input that includes but not limited to: identifications (or a list) of existing templates to be converted, identifications for new templates that are to be created, a list of network resources (e.g., interfaces, groups of ports, etc.) on which the new templates may be applied, and/or request options as defined below.

A request option refers to an option for different types of requests a user may make. In one embodiment, a request option is an option to request either only auditing of network resources as described below, or auditing and converting the network resources. An audit only request option may be used to identify inconsistencies prior to conversion of actual filters. For example, an audit only request may compare router configuration in the IP network with the router configuration in a provisioning system to identify inconsistencies. If the request option is an audit and convert option, the access control filter template tool first performs an audit. When the audit is completed successfully, the access control filter template tool generates the filter content for resources with successful audit. If the audit identifies an inconsistency, the filter content is not generated, and the appropriate notification is provided to network operations.

For example, a customer may make routing rule or security changes. The changes may then affect entries in the database 215 to be changed. The changes may then be propagated to one or more logical templates. For example, the filter template tool may: create or modify one or more access control filter templates, modify entries in the filter templates, validate the structure of the filter templates, and/or apply the filter templates to one or more test ports. If a new template is successfully applied to the test port, the new template becomes the default template for applicable interfaces and a conversion process is initiated to modify all filters in the network using the modified template to replace the filter contents.

In one embodiment, the filter template tool creates an filter template from an existing template. For example, the tool makes a duplicate of an existing template and makes modification to the newly created template.

The method may then establish a schedule for pushing down changes to filters for various interfaces. For example, a schedule may be established based on router location, grouping of ports, customer list, etc.

The method then identifies all affected interfaces. For example, the change may affect all PE interfaces tied to CEs for a specific list of customers. In another example, the change may affect all interfaces on PEs. In one embodiment, the filter template tool may have been provided with a list of interfaces that may be affected. For example, the service provider may change a network security rule and may notify the tool that the change is to be applied on all PE interfaces that are connected to CEs via another service provider, e.g., via an access network from a different service provider.

The method may then audit all affected interfaces. An audit is a method for reducing the chance of having an undesirable behavior after a conversion. For example, if the application server implements a modification to the content of a filter assuming knowledge of the latest routing rules but a CE had added new routes, the modification to the filter may result in an undesirable change. For example, the CE may lose its newly added route.

If the audit for an interface is successful, the method then generates pertinent commands from the logical templates and the interface configurations such that the changes may be propagated to the interface. If the audit is not successful, the method reports the trouble to a ticketing system and/or service provider personnel.

In another embodiment, the filter template tool downloads the filter content into the router interfaces. In another embodiment, the filter template tool interacts with an IP configuration tool and provides the filter content (e.g., commands for downloading the changes to the PE interfaces) to the IP configuration tool. The IP configuration tool may then download the filter content into the router interfaces.

Note that, the filter template tool does not overwrite configurations performed by the IP configuration tool. For example, the filter template tool does not change routing tables configured by the IP configuration tool. Note also that configuration changes generated during a filter conversion may impact a large number of filters linked to a large number of interfaces.

In one embodiment, the filter template tool monitors Border Gateway Protocol (BGP) sessions via a BGP monitoring tool. For example, the filter template tool may monitor a BGP session to determine if there are unexpected consequences after applying a new template to an interface.

Figure 3:
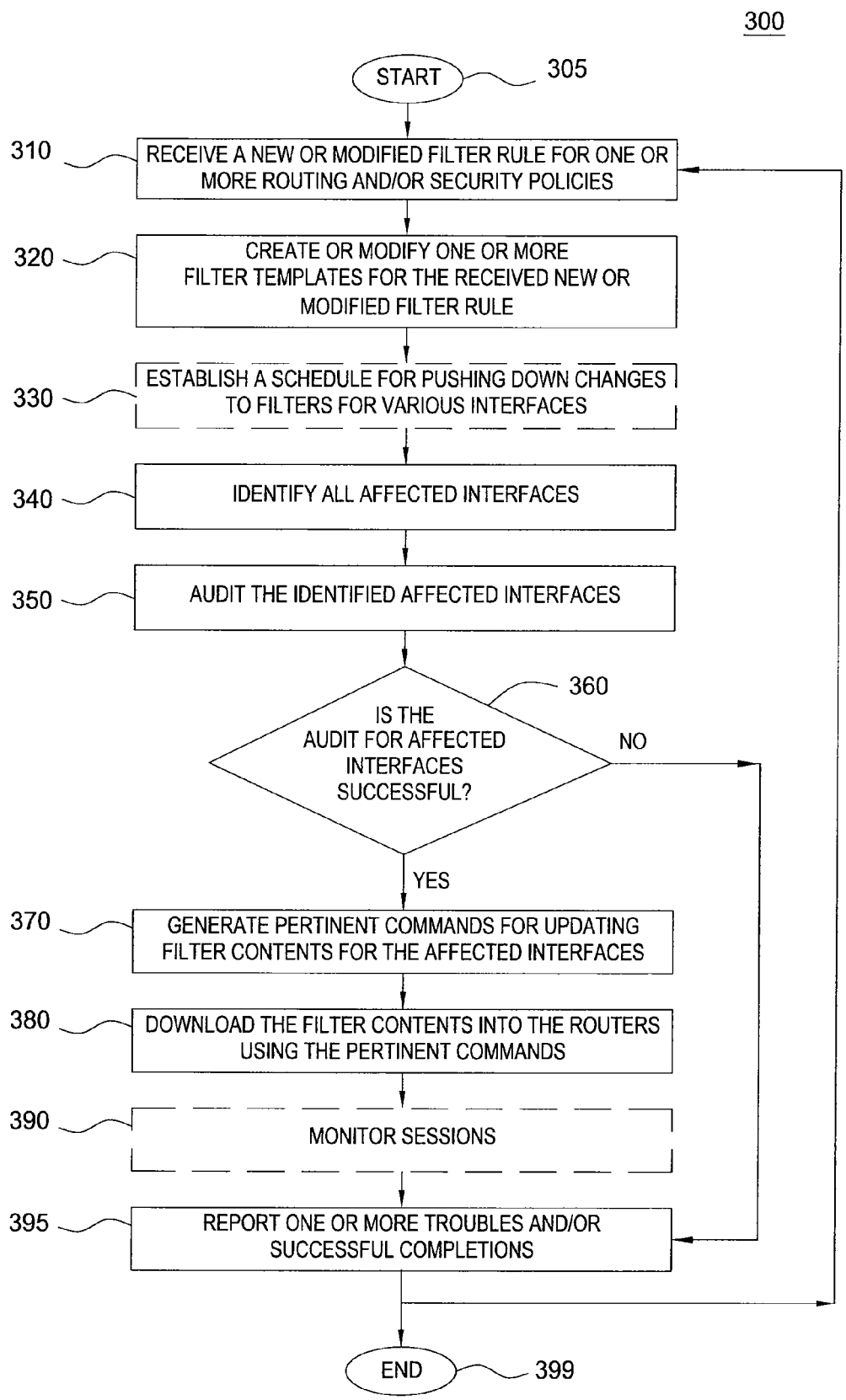
FIG. 3 illustrates a flowchart of a method for providing an access control filter and/or a routing filter.

FIG. 3 illustrates a flowchart of a method 300 for providing a filter. For example, method 300 can be implemented by the server 212. Method 300 starts in step 305 and proceeds to step 310.

In step 310, method 300 receives a new or modified filter rule for one or more routing and/or security policies. For example, a customer may make changes to a routing policy that affect a filter rule.

In step 320, method 300 creates or modifies one or more filter templates for the received new or modified filter rule. For example, the changes to the routing policy may affect filters being used by various router interfaces.

In optional step 330, method 300 establishes a schedule for pushing down changes to the filters for various interfaces. For example, the changes for filter rules may be made based on location, time zone, etc.

In step 340, method 300 identifies all affected interfaces. For example, the change may affect all PE interfaces tied to CEs for a specific list of customers. In another example, the change may affect all interfaces on all PEs.

In step 350, method 300 audits the identified affected interfaces. For example, the method may compare router configuration in the IP network with the router configuration in a provisioning system to identify inconsistencies.

In step 360, method 300 determines if the audit for affected interfaces is successful. If the audit is successful, then the method proceeds to step 370. Otherwise, the method proceeds to step 395. For example, in one embodiment the method continues processing at step 370 for any interface passing the audit. Interfaces not passing the audit are reported in step 395.

In step 370, method 300 generates pertinent commands for updating filter contents for the affected interfaces. For example, the method generates commands from the filter templates created or modified in step 320 and interface configurations to make the changes in the filters located in various PEs.

In step 380, method 300 downloads the filter contents into the routers using the commands. For example, the method may interact with an IP configuration tool to download the changes to the routers.

In an optional step 390, method 300 monitors one or more sessions. For example, the method may monitor Border Gateway Protocol (BGP) sessions to determine if there are unexpected consequences after applying a new template to an interface. The method then proceeds to step 395.

In step 395, method 300 reports one or more troubles and/or successful completions. For example, if an audit for an interface failed, then the method may report the audit failure to a ticketing system and/or service provider personnel. If the filter update is successfully completed, then the method reports the success. The method then proceeds to step 399 to end processing the current filter rule or returns to step 310 to continue receiving new or modified filter rules.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
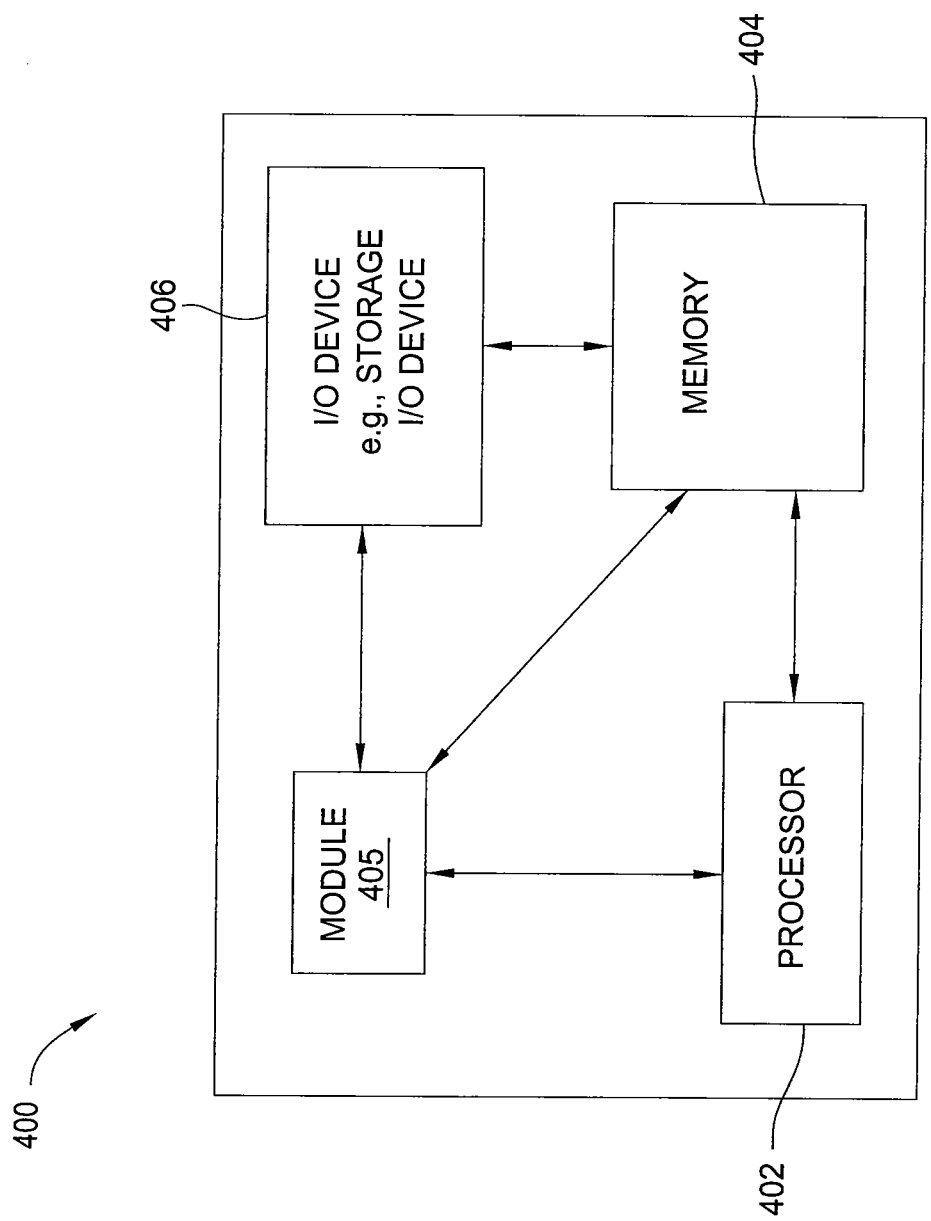
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing an access control filter, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing an access control filter can be loaded into memory 404 and executed by processor 402 to implement the functions as discussed above. As such, the present method 405 for providing an access control filter (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a routing filter, comprising:
    receiving, by a processor, a new filter rule associated with a routing policy, wherein the new filter rule affects a configurable entry for the routing policy;
    creating, by the processor, a filter template in accordance with the new filter rule, wherein the creating comprises generating the filter template from an existing template with a modification to implement a change for the configurable entry, wherein the new filter rule comprises a list of network resources on which the filter template is applied and a request option to request only auditing of the list of network resources;
    identifying, by the processor, an affected interface;
    auditing, by the processor, the affected interface;
    reporting, by the processor, a trouble when the auditing of the affected interface is unsuccessful;
    generating, by the processor, a command in accordance with the filter template when the auditing of the affected interface is successful; and
    downloading, by the processor, filter content to a router using the command.

2. The method of claim 1, further comprising:
    monitoring a session.

3. The method of claim 1, wherein a set of configurable entries for the routing policy is stored in a database.

4. The method of claim 3, wherein the set of configurable entries is provided in a format supported by the router.

5. A non-transitory computer-readable medium storing a plurality of instructions which, when executed by a processor, cause the processor to perform operations for providing a routing filter, the operations comprising:
    receiving a new filter rule associated with a routing policy, wherein the new filter rule affects a configurable entry for the routing policy;
    creating a filter template in accordance with the new filter rule, wherein the creating comprises generating the filter template from an existing template with a modification to implement a change for the configurable entry, wherein the new filter rule comprises a list of network resources on which the filter template is applied and a request option to request only auditing of the list of network resources;
    identifying an affected interface;
    auditing the affected interface;
    reporting a trouble when the auditing of the affected interface is unsuccessful;
    generating a command in accordance with the filter template when the auditing of the affected interface is successful; and
    downloading filter content to a router using the command.

6. The non-transitory computer-readable medium of claim 5, further comprising:
    monitoring a session.

7. The non-transitory computer-readable medium of claim 5, wherein a set of configurable entries for the routing policy is stored in a database.

8. The non-transitory computer-readable medium of claim 7, wherein the set of configurable entries is provided in a format supported by the router.

9. An apparatus for providing a routing filter, comprising:
    a processor; and
    a computer-readable medium storing a plurality of instructions which, when executed by the processor, cause the processor to perform operations, the operations comprising:
        receiving a new filter rule associated with a routing policy, wherein the new filter rule affects a configurable entry for the routing policy;
        creating a filter template in accordance with the new filter rule, wherein the creating comprises generating the filter template from an existing template with a modification to implement a change for the configurable entry, wherein the new filter rule comprises a list of network resources on which the filter template is applied and a request option to request only auditing of the list of network resources;
        identifying an affected interface;
        auditing the affected interface;
        reporting a trouble when the auditing of the affected interface is unsuccessful;
        generating a command in accordance with the filter template when the auditing of the affected interface is successful; and
        downloading filter content to a router using the command.

10. The apparatus of claim 9, further comprising:
    monitoring a session.

11. The apparatus of claim 9, wherein a set of configurable entries for the routing policy is stored in a database.

* * * * *